United States Patent [19]

Otani et al.

[11] Patent Number: 5,391,429
[45] Date of Patent: Feb. 21, 1995

[54] POLYESTER FILM

[75] Inventors: Yuzo Otani, Tokyo; Toshifumi Takisawa, Kawasaki; Shin-ichi Kinoshita; Masato Fujita, both of Machida, all of Japan

[73] Assignee: Diafoil Hoechst Company, Limited, Tokyo, Japan

[21] Appl. No.: 368

[22] Filed: Jan. 4, 1993

[30] Foreign Application Priority Data

Jan. 7, 1992 [JP] Japan ................................. 4-001057
Feb. 27, 1992 [JP] Japan ................................. 4-041457
Apr. 7, 1992 [JP] Japan ................................. 4-085625

[51] Int. Cl.$^6$ ...................... B32B 27/36; B29C 55/12
[52] U.S. Cl. ..................................... 428/327; 428/201; 428/206; 428/336; 428/480; 428/483; 428/900; 428/910
[58] Field of Search ............... 428/480, 483, 910, 201, 428/206, 327, 336, 900

[56] References Cited

U.S. PATENT DOCUMENTS 4,233,352 11/1980 Ono et al. .......................... 428/141
4,568,600 2/1986 Ono et al. .......................... 428/145

FOREIGN PATENT DOCUMENTS 0188620 7/1986 European Pat. Off. .

OTHER PUBLICATIONS

JP 58-062826 (1983) Abstract.
JP-01-165633 (1989) Abstract.
Naohiro, T., et al., "Production of Polyester Film Having Coating Layer", Pub. No. 01-165633, Jun. 29, 1989 (English Abstract).
JP Publication No. 41-8470, English Abstract.
JP Kokai No. 57-18254, English Abstract.
JP Kokai No. 54-43017, English Abstract.
Database WPIL, Section Ch, Week 9007, Derwent Publications Ltd., London, GB.
Database WPIL, Section Ch, Week 8521, Derwent Publications Ltd., London, GB.
Database WPIL, Section Ch, Week 9110, Derwent Publications Ltd., London, GB.

*Primary Examiner*—P. C. Sluby
*Attorney, Agent, or Firm*—Foley & Lardner

[57] ABSTRACT

A polyester resin film which is biaxially oriented and again oriented in a machine direction and a coating layer formed on at least one surface of the film, in which the coating layer contains at least 50% by weight of a water-soluble or water-dispersible polyester resin having a glass transition temperature of at least 20° C., which film has a good adhesion property.

19 Claims, No Drawings

POLYESTER FILM

BACKGROUND OF THE INVENTION

1. Field of the Invention

The present invention relates to a polyester film, in particular, a high strength polyester film having a coating layer on at least one surface thereof and an improved adhesion property.

2. Description of the Related Art

Polyester films, a typical example of which is a polyethylene terephthalate film, have good physical and chemical properties and are used as a graphic art material, a display material, a packaging film, and the like. Further the polyester film is widely used as a base film of a magnetic recording medium or a dielectric material of a capacitor.

Recently, in order to prolong a recording time of a magnetic tape, a film which is thinner and has higher strength is required in the field of a base film of a magnetic recording medium. The high strength film can be produced by restretching a biaxially oriented film as disclosed in Japanese Patent Publication No. 5887/196. However, since a surface of the high strength film is highly crystalline oriented, its surface has large cohesiveness so that it has poor adhesion with a magnetic paint, an adhesive, an ink, and the like.

One of the recently employed methods for improving the adhesion property of such film comprises coating a surface of the polyester film with a certain material in the production process to form a coating layer with adhesive properties as disclosed in Japanese Patent Publication No. 8470/1966. For example, an aqueous or solvent base coating liquid is applied on an unoriented or uniaxially oriented film, and the coated film is uniaxially or biaxially oriented.

Since roll stretching is usually employed in the restretching step for increasing the strength, the coating layer adheres to the heating roll so that the film is broken frequently. Therefore, the coated film is not stably produced.

SUMMARY OF THE INVENTION

An object of the present invention is to provide a biaxially oriented polyester film having a coating layer thereon, which has a good surface adhesion property and high strength.

According to the present invention, there is provided a polyester resin which is biaxially oriented and again oriented in a machine direction and a coating layer formed on at least one surface of said film, wherein said coating layer contains at least 50% by weight of a water-soluble or water-dispersible polyester resin having a glass transition temperature of at least 200° C.

DETAILED DESCRIPTION OF THE INVENTION

The polyester of the polyester film used herein is a polyethylene terephthalate at least 80% of repeating units of which are ethylene-terephthalate units, polyethylene naphthalate at least 80% of repeating units of which are ethylene-naphthalate units, or poly-1,4-cyclohexanedimethylene terephthalate at least 80% of repeating units of which are 1,4-cyclohexanedimethylene-terephthalate units.

In addition to the above essential monomer components, the polyester may comprise at least one other copolymerizable monomer. Examples of other glycol component are diethylene glycol, propylene glycol, neopentyl glycol, polyethylene glycol, polytetramethylene glycol, and the like. Examples of other aromatic dicarboxylic acid are isophthalic acid, 2,6-naphthalenedicarboxylic acid, 5-sodiumsulfoisophthalic acid, adipic acid, azelaic acid, sebacic acid and their ester-forming derivatives, and hydroxymonocarboxylic acids (e.g. hydroxybenzoic acid) and their ester-forming derivatives.

The polyester film to be used in the present invention may contain particles which are used for forming protuberances on the film surface, precipitated particles, or a residue of a catalyst in an amount that the below described electromagnetic conversion characteristics are not deteriorated. In addition to the protuberance-forming particles, if necessary, the polyester may contain other additive such as an antistatic agent, a stabilizer, a lubricant, a crosslinking agent, an anti-blocking agent, an antioxidant, a colorant, a light-shielding agent, a UV light absorber, and the like.

According to the present invention, the coating layer is formed by applying a coating liquid which contains a water-soluble or water-dispersible polyester resin having a glass transition temperature of at least 20° C., preferably at least 25° C., more preferably from 30° to 70° C. and drying the coated liquid.

When the glass transition temperature of the polyester resin is too high, the adhesion of the coating layer with the magnetic paint, the adhesive or the ink is deteriorated. When the glass transition temperature is too low, the coating layer tends to adhere to the heating roll used in the restretching step so that the film may not be stably produced.

A content of the water-soluble or water-dispersible polyester resin in the coating layer is at least 50% by weight, preferably at least 60% by weight, more preferably at least 70% by weight based on the weight of the coating layer. When the content of the water-soluble or water-dispersible polyester resin is less than 50% by weight, the adhesion of the coating layer with the magnetic paint, the adhesive or the ink is deteriorated, or the coating layer tends to adhere to the heating roll used in the restretching step so that the film may not be stably produced.

As the components for preparing such water-soluble or water-dispersible polyester resin, the following polybasic carboxylic acids and polyhydric alcohols can be used. Examples of the polybasic carboxylic acids are terephthalic acid, isophthalic acid, orthophthalic acid, phthalic acid, 4,4'-dipthenyidicarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, monopotassium trimellitate, and their ester-forming derivatives. Examples of the polyhydric alcohols are ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylene glycol, bisphenol A-ethylene glycol additive, diethylene glycol, triethylene glycol, polyethylene glycol, polypropylene glycol, polytetramethylene glycol, polytetramethyleneoxide glycol, dimethylolpropionic acid, glycerol, trimethylolpropane, sodium dimethylolethylsulfonate, potassium dimethylolpropionate, and the like. From the above compounds, at least one polybasic carboxylic acid and at least one polyhydric alcohol are selected and polycondensated by a conventional method to obtain the polyester resin having the glass transition temperature in the above range.

In addition to the above polyester resins, a complex polymer containing the polyester component such as a so-called acryl-grafted polyester which is disclosed in Japanese Patent Kokai Publication No. 165633/1989, or an polyesterpolyurethane prepared by chain extending polyesterpolyol with an isocyanate may be used as the polyester resin according to the present invention.

The polyester resin is applied in the form of a coating liquid comprising water as a medium. While the coating liquid may be a dispersion formed by forced dispersion of the resin with a surfactant, preferably it is a self-dispersing coating liquid of the polyester resin containing a hydrophilic nonionic component such as a polyether or a cationic group such as a quaternary ammonium salt. More preferably, the coating liquid is one comprising a water-soluble or water-dispersible polyester resin having an anionic group.

The polyester having the anionic group means a polyester to which a compound having an anionic group is bonded by copolymerization or grafting. Examples of such compound are sulfonic acid, carboxylic acid, phosphoric acid and their lithium, sodium, potassium and ammonium salts.

An amount of the anionic group in the polyester resin is from 0.05 to 8% by weight based on the weight of the resin. When the amount of the anionic group is less than 0.05% by weight, the polyester resin has poor water-solubility or water-dispersibility. When this amount exceeds 8% by weight, water resistance of the formed coating layer is deteriorated or the films absorb moisture and adhere each other unpreferably.

In a preferred embodiment, the coating layer according to the present invention has standing-up protuberances made of a water-soluble or water-dispersible resin to prevent adhesion of the film to the heating roll and maintain stable production.

The standing-up protuberances may be formed by applying a coating liquid containing a specific polymer which is characterized in the specific phase separation or orientation properties in the coating layer on the film and stretching the coated film in the production process of the polyester film, as proposed in Japanese Patent Kokai Publication Nos. 43017/1979, 18254/1982 and 62826/1983.

Examples of the polymer which provides the standing-up protuberances are water-soluble polymers such as cellulose, gelatin, polyacrylic acid or its salts, polystyrenesulfonic acid or its salt, and the like.

An amount of the polymer which provides the standing-up protuberances is preferably from 1 to 50% by weight, more preferably from 5 to 40% by weight based on the weight of the coating layer. When the amount of this polymer is less than 1% by weight, the coating layer tends to adhere to the heating roll for restretching. When this amount exceeds 50% by weight, the strength of the coating layer may be decreased so that the coating layer may be peeled off easily.

In another preferred embodiment, the coating layer according to the present invention contains a lubricant. Specific examples of the lubricant herein used are anionic surfactants, cationic surfactants, amphoteric surfactants, nonionic surfactants, fluorine-containing surfactants, organic carboxylic acids or their derivatives, higher aliphatic alcohols, paraffins, waxes, and the like. Particularly preferred lubricants are polyolefin or silicone lubricants.

Examples of the polyolefin lubricant are a wax, resin or rubber comprising a homo- or copolymer of 1-olefinically unsaturated hydrocarbons such as ethylene, propylene, 1-butene, 4-methyl-1-pentene, etc., for example, polyethylene, polypropylene, poly-1-butene, poly-4-methyl-1pentene, ethylene-propylene copolymer, an aliphatic dicarboxylic acid (e.g. azelaic acid, sebacic acid, etc.), a hydroxycarboxylic acid (e.g. hydroxybenzoic acid, etc.) or their ester-forming derivatives.

As the slicone lubricant, unmodified silicone or silicone which is modified with a fatty acid, a polyether, an alcohol or a polar group such as a alkyl group can be used. The silicone modified with the polar group is preferred since it has good compatibility with a binder resin.

A preferred lubricant is a material which is exuded on the coating layer when it is compounded in the resin, coated on the polyester film and stretched. The lubricant which is exuded on the surface of the coating layer prevents the adhesion of the coating layer to the heating roll in the restretching step. In addition, due to a lubricating function of the exuded lubricant, the coating layer is less flawed during traveling with being contacted to a conveyor roll.

An amount of the lubricant is preferably from 0.5 to 20% by weight based on the weight of the resin in the coating layer. When the amount of the lubricant is less than 0.5% by weight, an amount of the lubricant which is exuded on the coating layer surface is too small so that the sufficient anti-blocking effect may not be obtained. When this amount exceeds 20% by weight, too much lubricant is exuded so that the lubricant may interfere the easy adhesion property of the resin in the coating layer.

When molecules of the exuded lubricant are coordinated with a hydrophobic group being outside, the maximum anti-blocking effect is achieved. A measure for this coordination is an contact angle of water. When the contact angle of water is in a range between 70 and 85 degrees, the anti-blocking effect is realized.

A thickness of the coating layer is usually from 0.03 to 2 $\mu$m, preferably from 0.05 to 1 $\mu$m, more preferably from 0.06 to 0.2 $\mu$m in terms of a final dry thickness. When the coating layer has a thickness larger than 2 $\mu$m, the films tend to adhere each other or the film tends to adhere to a roll in the production process. When the coating layer has a thickness smaller than 0.03 $\mu$m, it may have insufficient adhesion with the magnetic paint, the adhesive or the ink.

To prevent the adhesion of the coating layer to the heating roll for restretching, it is preferably for the coating layer to contain particles having a specific particle size. Such particles will improve the anti-blocking or slipping properties.

Preferably, an average particle size d ($\mu$m) of such particles satisfies a relationship of $0.5 \leq d/t \leq 3$, more preferably $0.7 \leq d/t \leq 2.5$, in particular $0.8 \leq d/t \leq 2$, in which "t" is a dry thickness of the coating layer ($\mu$m).

When the ratio d/t is smaller than 0.5, the coating layer tends to adhere to the heating roll for restretching so that the continuous production of the film may be interfered. When the ratio d/t exceeds 3, the film may be opacified, or white powder may be generated due to the dropped off particles. Further, when the film is used as the base film of magnetic recording medium, the electromagnetic conversion characteristics such as a S/N ratio may be deteriorated or the number of dropouts may increases.

A content of the particles is usually from 0.1 to 20% by weight, preferably from 1 to 15% by weight, more preferably from 3 to 10% by weight based on the weight of the coating layer. When the content of the particles is less than 0.1% by weight, the coating layer may have an insufficient anti-blocking effect. When the content exceeds 20% by weight, the film is opacified or the white powder may be generated due to the dropped off particles. Further, when the film is used as the base film of magnetic recording medium, the electromagnetic conversion characteristics such as a S/N ratio may be deteriorated or the number of dropouts may increases.

The particles may be inorganic or organic ones. Examples of the inorganic particles are silica, silica sol, alumina, alumina sol, zirconium sol, kaolin, talc, calcium carbonate, calcium phosphate, titanium oxide, barium sulfate, carbon black, molybdenum sulfide, antimony oxide sol, and the like. Examples of the organic particles are polystyrene, polyethylene, polyamide, polyester, polyacrylate, epoxy resin, polyvinyl acetate, polyvinyl chloride, copolymers of monomers constituting the above polymers, which polymers may contain a crosslinking agent, silicone resin, fluororesins, and the like.

For the purposes of the improvement of a blocking property, water resistance, solvent resistance and mechanical strength of the coating layer, and of the prevention of adhesion to the heating roll for restretching, the coating layer may contain, as a crosslinking agent, a methyloled or alkyloled urea, melamine, guaniamine, acrylamide or polyamide compound, an epoxy compound, an aziridine compound, a blocked polyisocyanate, a silane coupling agent, a titanate coupling agent, a zirco-aluminate coupling agent, a peroxide, a heat- or light-reactive vinyl compound or a photosensitive resin.

If necessary, the coating layer may contain a foam inhibitor, a coating improver, a tackifier, an antistatic agent, an organic lubricant, an antioxidant, a UV light absorber, a foaming agent, a dye, a pigment and the like.

In addition to the essential polyester resin, the coating layer may contain other resin such as other polyester resin, a polyurethane resin, an aqueous acryl resin, a vinyl resin, and the like to improve the properties of the coating liquid and/or the coating layer.

Typical examples of main components of the polyurethane which can improve the coating properties are a polyisocyanate, a polyol, a chain extender, a crosslinking agent, and the like.

Examples of the polyisocyanate are tolylenediisocyanate, phenylenediisocyanate, 4,4'-diphenylmethanediisocyanate, hexamethylenediisocyanate, xylylenediisocyanate, 4,4'-dicyclohexylmethanediisocyanate, isophoronediisocyahate, and the like.

Examples of the polyol are polyethers such as polyoxyethylene glycol, polyoxypropylene glycol and polyoxytetramethylene glycol; polyesters such as polyethylene adipate, polyethylene-butylene adipate and polycaprolactone; acrylic polyols; castor oil; and the like.

Examples of the chain extender or the crosslinking agent are ethylene glycol, propylene glycol, diethylene glycol, trimethylolpropane, hydrazine, ethylenediamine, diethylenetriamine, 4,4'-diaminodiphenylmethane, 4,4'-diaminodicyclohexylmethane, water and the like.

To prepare an aqueous solution or dispersion of the polyurethane resin, the polyurethane resin may be forced to disperse using a surfactant. Preferably, a self-dispersion type coating material having a hydrophilic nonionic component such as a polyether or a cationic group such as a quaternary ammonium salt, or a water-soluble or water-dispersible polyurethane resin having an anionic group is used.

The polyurethane resin having the anionic group may be prepared by reacting a polyol, a polyisocyanate compound and a chain extender at least one of which has the anionic group; by reacting an unreacted isocyanate group of a polyurethane with a compound having the anionic group; or by reacting a group having an active hydrogen in the polyurethane with a specific compound.

When the compound having the anionic group is used as one of the components for the preparation of polyurethane, a compound prepared by sulfonating an aromatic isocyanate compound, a diaminocrboxylic acid salt, a sulfuric acid salt of an aminoalcohol, and the like may be used.

In the process for reacting the unreacted isocyanate group of the polyurethane and the compound having the anionic group, a bisulfite, an aminosulfonic acid or tis salt, an aminocarboxylic acid or its salt, a sulfuric acid eater of an aminoalcohol or its salt, a hydroxyacetic acid or its salt, and the like may be used.

In the process for reacting the group having an active hydrogen in the polyurethane with the specific compound, a cyclic compound such as a dicarboxylic anhydride, a tetracarboxylic anhydride, sultone, lactone, an epoxycarboxylic acid, an epoxysulfonic acid, 2,4-dioxooxazoline, isatoic anhydride, or carbyl sulfate may be used.

Preferably, the polyurethane resin which is optionally used has a number average molecular weight of 300 to 20,000 and comprises the polyol, the polyisocyanate, the chain extender having a reactive hydrogen atom, and a compound having at least one group reactive with the isocyanate group and at least one anionic group. Examples of the anionic group in the polyurethane resin are —$SO_3H$, —$OSO_3H$ and —COOH, which may be in a salt form with lithium, sodium, potassium or magnesium. Among them, the sulfonate salt group and the carboxylate salt group are preferred.

An amount of the anionic group in the polyurethane resin is preferably from 0.05 to 8% by weight based on the weight of the polyurethane resin. When the amount of the anionic group is too small, the polyurethane resin has poor water-solubility or water-dispersibility. When the amount of the anionic group is too large, the coating layer may have deteriorated water resistance or absorb moisture so that the films tend to adhere each other.

The aqueous acryl resin means a water-soluble or water-dispersible acrylic resin and preferably comprises an alkyl acrylate or alkyl methacrylate. In general, the water-soluble or water-dispersible acryl resin comprises 30 to 90% by mole of the alkyl acrylate or alkyl methacrylate and 70 to 10% by mole of a copolymerizable vinyl monomer having a functional group.

The vinyl monomer having the functional group and copolymerizable with the alkyl acrylate or alkyl methacrylate preferably has a functional group which imparts the resin with hydrophilicity to improve the water dispersibility of the resins, improves the adhesion of the coating layer to other layer formed on the coating layer, or increases a compatibility of the acryl resin with the polyester resin used as the essential resin in the coating layer. Examples of such functional group are a carboxyl group or it salt form, an acid anhydride group, a sulfonic acid group or its salt form, an amido group, an alkyloled amido group, a substituted or unsubstituted amino group which may be alkyloled or its salt form, a hydroxyl group, an epoxy group, and the like. Among them, the carboxyl group or its salt form, the acid anhydride group and the epoxy group are preferred. Two or more groups may be present in the acryl resin.

When the content of the alkyl acrylate or alkyl methacrylate is at least 30% by mole, a coating property and strength and anti-blocking property of the coating layer are improved. When the content of the alkyl acrylate or alkyl methacrylate does not exceed 90% by mole, the introduction of the compound having the specific group as the comonomer improves the water-solubility or water-dispersibility of the resin and stabilizes a dissolved or dispersed state of the resin for a long time. In addition, the compound having the specific group can improve the adhesion between the polyester film and the coating layer, strength, water resistance and chemical resistance of the coating layer through a reaction in the coating layer, and also adhesion of the film of the present invention with other material.

The alkyl group in the alkyl acrylate or alkyl methacrylate is a straight or branched, or cyclic alkyl group having 1 to 18 carbon atoms.

Examples of the alkyl group in the alkyl acrylate or alkyl methacrylate are a methyl group, a n-propyl group, an isoproyl group, a n-butyl group, an isobutyl group, a 2-ethylhexyl group, a lauryl group, a stearyl group, a cyclohexyl group, and the like.

As the vinyl compound having the functional group and copolymerizable with the alkyl acrylate or alkyl methacrylate, a compound having a reactive functional group, a self-crosslinkable group or a hydrophilic group may be used. Examples of the copolymerizable vinyl compound are acrylic acid, methacrylic acid, itaconic acid, maleic acid, their alkali metal salts, alkaline earth metal salts or ammonium salts, maleic anhydride, and the like.

Examples of the compound having the sulfonic acid group or its salt form are vinylsulfonic acid, styrenesulfonic acid, their salts with a metal such as sodium, or their ammonium salts.

Examples of the compound having the amido group or methyloled amido group are acrylamide, methacrylamide, N-methylmethacrylamide, methylolacrylamide, methylolmethacrylamide, ureidovinyl ether, $\beta$-ureidovinyl ether, ureidoethyl acrylate, and the like.

Examples of the compound having the amino group or alkyloled amino group are diethylaminoethyl vinyl ether, 2-aminoethyl vinyl ether, 3-aminopropyl vinyl ether, 2-aminobutyl vinyl ether, dimethylaminoethyl methacrylate, dimethylaminoethyl vinyl ether, these compounds an amino group of which is alkyloled, or their quaternary salts with alkyl halides, dimethylsulfuric acid or sultone, and the like.

Examples of the compound having the hydroxyl group are $\beta$-hydroxyethyl acrylate, $\beta$-hydroxyethyl methacrylate, $\beta$-hydroxypropyl acrylate, $\beta$-hydroxypropyl methacrylate, $\beta$-hydroxyvinyl ether, 5-hydroxypentyl vinyl ether, 6-hydroxyhexyl vinyl ether, polyethylene glycol monoacrylate, polyethylene glycol monomethacrylate, polypropylene glycol monoacrylate, polypropylene glycol monomethacrylate, and the like.

Examples of the compound having the epoxy group are glycidyl acrylate, glycidyl methacrylate, and the like.

In addition to the above compounds, the following compounds may be used in combination:
acrylonitrile, styrene compounds, butyl vinyl ether, mono- or dialkyl maleate, mono- or dialkyl fumarate, mono- or dialkyl itaconate, methyl vinyl ketone, vinyl chloride, vinylidene chloride, vinyl acetate, vinylpyridine, vinylpyrrolidone, vinyltrimethoxysilane, and the like.

The acryl resin may contain a surfactant. When a content of the acryl resin is relatively large in comparison with the polyester resin and the polyurethane resin, a low molecular weight surfactant contained in the acryl resin is concentrated in the film formation process and accumulated at interfaces between particles or migrates on the interface of the coating layer so that the mechanical strength or water resistance of the coating layer or the adhesion of the coating layer to the base polyester film may be deteriorated. To prevent such drawbacks, an acryl resin prepared by a so-called soap-free polymerization method using no surfactant can be used.

The preparation method of the acryl resin which uses no surfactant is disclosed in, for example, "Collective Technical Documents of Water-Soluble Polymers and Water-Dispersible Resins" page 309 (edited and published by the Publishing Division of the Business Development Center in January 1981 ) or the text book of the lecture entitled "Future Views from the Recent Research Results —New Developments of Emulsions and Future Technical Problems" (December 1989).

For the preparation of the water-dispersible acryl resin in the absence of the surfactant, an oligomeric or polymeric surfactant is used in place of a low molecular weight surfactant, a hydrophilic group is introduced in tile acryl resin by the use of potassium persulfate or ammonium persulfate as a polymerization initiator, a monomer having a hydropylic group is copolymerized, a reactive surfactant is used, a so-called core-shell form polymer having different structures between an inner part and a surface part of each polymer particle is prepared.

The coating liquid which is prepared as described above is applied on the already biaxially oriented polyester film or on the polyester film in the stretching steps by any of conventional coating apparatuses such as a reverse roll coater, a gravure coater, a rod coater, an air doctor coater, and the like.

To apply the coating liquid on the polyester film in the stretching steps, the coating liquid is applied on the polyester which is uniaxially oriented in the machine direction and the film is stretched in a direction perpendicular to the previous orientation direction with or without drying the coating liquid and heat treated. This method is preferably employed in view of the cost performance since the film stretching and the drying of the coating liquid are simultaneously carried out.

The film is stretched preferably at a temperature of 60° to 130° C. and a draw ratio is at least 4 times, preferably from 6 to 20 times in terms of an area ratio.

The oriented film is heat treated at a temperature of 150° to 250° C. Preferably, the film is shrunk by 0.1 to 20% in the machine and transverse directions in the maximum temperature zone and/or a cooling zone in the heat treatment step.

In a preferred embodiment, the polyester film is stretched in the machine direction by the roll stretching at a temperature of 60° to 130° C. at a draw ratio of 2 to 6 times, the coating layer is applied on the uniaxially oriented film and optionally dried. Then the polyester film carrying the dried or undried coating liquid is stretched in a direction perpendicular to the above stretching direction at a temperature of 80° to 150° C. at a draw ratio of 2 to 6 times and further stretched in the machine direction at a temperature of 85° to 180° C. at a draw ratio of 1.01 to 1.9 times, and the oriented film is heat treated at a temperature of 50° to 250° C. for 1 to 600 seconds. Before the heat treatment, the film can be again stretched in the transverse direction at a temperature of 85° to 180° C. at a draw ratio of 1.01 to 1.9 times, whereby the strength in the transverse direction is increased.

By the above method, the stretching and the drying of the coated liquid are simultaneously carried out and the thickness of the coated layer is made thin according to the draw ratio of the film. Therefore, the polyester film suitable as a base film is produced at a low cost.

The coating liquid may be applied on either one or both of the surfaces of the polyester film. When the coating liquid is applied on one surface, a coating layer other than that of the present invention may be formed on the other surface to impart the polyester film with some other properties.

The surface of the polyester film may be chemically treated or treated with electrical discharge before the application of the coating liquid so as to improve the coating property and the adhesion of the coating liquid. Further, the formed coating layer may be treated by electrical discharge to improve the adhesion of the layer to the polyester film and the coating property of the surface of the coating layer.

In a preferred embodiment, the polyester film is a polyethylene terephthalate film having a $F_5$ strength value of at least 13 kgf/mm$^2$, in particular at least 18 kgf/mm$^2$, at 5% elongation in the machine direction. When the $F_5$ value is less than 13 kgf/mm$^2$ the film is elongated too much when a tension is applied in use. In particular, when the polyester film is used as a base film of the magnetic recording medium, too much elongation causes deformation of a picture which is called as a skew or deteriorates sound tone.

Since the polyethylene naphthalate film has a high strength at a smaller thickness than the polyethylene terephthalate film, it is preferably used as a base film of a video tape for a long time recording.

Preferably, the coating layer which is formed as above has a center line average roughness (Ra) of 0.002 to 0.020 μm, more preferably 0.004 to 0.018 μm, most preferably 0.006 to 0.015 μm. When Ra is less than 0.002 μm, the film has an insufficient slipping property so that the workability is worsened. When Ra exceed 0.020 μm, the surface becomes too rough, so that, when the film is used as the base film of the magnetic recording medium, the electro-magnetic conversion characteristics such as the S/N ratio are deteriorated and the number of drop-outs increases.

The present invention will be illustrated by the following Examples, which do not limit the scope of the present invention. In Examples, "parts" are by weight.

In Examples, the properties and characteristics are measured or evaluated as follows:

(1) Glass transition temperature (Tg)

A differential scanning calorimeter (SSC 580 DSC 20 manufactured by Seiko Electronics Industries, Ltd.) is used.

A freeze dried sample (10 mg) of a polymer is set in the DSC and heated up to 200° C. at a heating rate of 10° C./min., quenched with liquid nitrogen and again heated from −50° C. to 200° C. at a heating rate of 10° C/min. to determine a glass transition temperature. The glass transition temperature is detected by a parallel shift of a base line due to flexing of a DSC curve caused by a change of a specific heat. As a flexing starting point, is selected a point of intersection between a tangential line with the base line at a temperature lower than the above flexing point and a tangential line at a point at which the slope is maximum in the flexed part. This flexing starting point is used as a glass transition temperature.

(2) Center line average roughness (Ra)

Using a surface roughness tester (SE-3F manufactured by Kosaka Kenkyusho, Ltd.), the center line average roughness Ra is measured according to JIS B-0601-1976, with necessary modifications. The measuring conditions are the use of a contact needle having a tip radius of 2 μm, 30 mg of probe contact pressure, 0.08 mm of cutoff, and 2.55 mm of a measuring length.

The measurement is performed at 10 points on the film and the surface roughnesses are averaged.

(3) Tensile strength ($F_5$ value)

Using a tensile tester (Intesco Model 2001 manufactured by Intesco, Ltd.), a sample film having a length of 50 mm and a width of 15 mm is pulled at a rate of 50 mm/min. at 23° C., 50% RH, and a strength at an elongation of 5% is recorded as the $F_5$ value.

(4) Adhesion to a heating roll for restretching

The adhesion to a heating roll for restretching is evaluated by the stability in the film production process. That is, the number of breakages caused by the adhesion of the film to the heating roll for restretching is counted in one hour and ranked according to the following criteria:

○: Less than 0.1 time/hr.
Δ: 0.1 to 1 time/hr.
×: More than 1 time/hr.

(5) Blocking property

The blocking property is evaluated by heat pressing a pair of films in a thermo-hygrostat at 40° C., 80% RH under 10 kgf/cm$^2$ for 20 hours, and a peeling strength of the adhered films is measured according to ASTM-D-1893. The results are ranked according to the following criteria:

○: Less than 5 g/cm.
Δ: 5 to 10 g/cm.
×: Larger than 10 g/cm.

(6) Amount of white powder

White powder adhered to a feed roll in a winder of the oriented film is observed with naked eyes and evaluated according to the following criteria:

○: No white powder
Δ: A mall amount of white powder
×: A large amount of white powder (7) Adhesion of a printing ink A printing ink for celocolor (CCST 39 Indigo manufactured by Toyo Ink Manufacturing Co., Ltd. ) is coated on the coating layer of the film at a thickness of 1.5 μm after drying and hot air dried at 80° C. for one minute to obtain a sample film for evaluation. Then, the sample film is conditioned at 23° C., 50% RH for 24 hours. On the ink layer, an adhesive tape having a width of 18 mm (Celotape manufactured by Nichiban Co., Ltd.) is adhered with leaving no bubble for a length of 7 cm and pressed with a manual loading roll under a load of 3 kg. 180 Degree peeling strength is measured by fixing the film, connecting one end of the adhesive tape to a weight of 500 g and starting the peeling when the weight spontaneously drops for a distance of 45 cm. The peeling strength is ranked according to the following criteria:

5: No ink is transferred to the adhesive tape.
4: Less than 10% of the ink layer is transferred to the adhesive tape.
3: 10 to 50% of the ink layer is transferred to the adhesive tape.
2. More than 50% of the ink layer is transferred to the adhesive tape.
1. All the ink layer is transferred to the adhesive tape.

(8) Characteristics of a video tape
( Characteristics of a magnetic recording medium)
A video tape is produced as follows:
Magnetic fine powder (200 parts), a polyurethane resin (30 parts), nitrocellulose (10 parts), a vinyl chloride-vinyl acetate copolymer (10 parts), lecitin (5 parts), cyclohexanone (100 parts) and methyl ethyl ketone (300 parts) are mixed and dispersed in a ball mill for 48 hours, followed by the addition of a polyisocyanate compound (5 parts) to obtain a magnetic paint.

The magnetic paint is coated on a polyester film to a dry thickness of 5 μm, magnetically orientated before it is sufficiently dried and then dried.

The coated film is subjected to super calendering and slit at a width of ½ inch to obtain a video tape.

The characteristics of the video tape are evaluated using a NV-3700 video deck (manufactured by Matsushita Electric ) at a normal speed.

A VTR head output at a measuring frequency of 4 MHz is measured by a synchroscope. The measured value is expressed as a relative value (dB) to a value of a standard tape (0 dB ).

○: Larger than +2 dB.
Δ: +0 to +2 dB.
×: Smaller than 0 dB.

A skew amount is measured by reproducing the video tape which records chroma video signals, carrying out delayed sweeping with a color monitor (CMM 20-11 manufactured by Shibasoku Co., Ltd.), reading a skew amount on the screen and converting the read skew amount to a one horizontal scanning time in comparison with a full width of the monitor screen to obtain the skew amount in the unit of "μsec.", which is ranked according to the following criteria:

○: Shorter than 2 μsec.
Δ: 2 to 5 μsec.
×: Longer than 5 μsec.

(9) Bonding force of a magnetic layer
The bonding force of the magnetic layer to the film is measured as follows:
A double-coated adhesive tape (Scotch Tape No. 665 manufactured by Sumitomo 3M) is adhered to the magnetic layer and 180 degree peeling strength is measured using a tensile tester (Intesco Model 2001 manufactured by Intesco, Ltd.) at a pulling rate of 500 mm/min. in a room kept at 23° C., 50% RH. The bonding force is ranked according to the following criteria:

○: Larger than 30 grf.
Δ: 15 to 30 grf.
×: Smaller than 15 grf.

(10) Contact angle of water droplet
Using a contact angle tester (CA-D A type manufactured by Kyowa Interface Science), a contact angle is measured by a droplet method. Water is purified with MILLI-Q REAGENT-WATER-SYSTEM (manufactured by Millipore). After about 30 seconds from the dropping of a water droplet, the measurement is started. The measurement is repeated six times and the contact angles are averaged.

(11) Average particle size
Using a centrifugal sedimentation type particle size distribution analyzer (SA-CP 3 manufactured by Shimadzu Corporation), particle sizes are measured by the sedimentation method based on the Stokes'law. An integrated value of 50% based on the weight in the resulted equivalent sphere distribution of the particles is used as an average particle size.

EXAMPLE 1

A mass of polyethylene terephthalate having an intrinsic viscosity of 0.62 and containing 0.3% of silica particles having an average particle size of 0.12 μm and 0.02% of a crosslinked polymer particles having an average particle size of 0.6 μm was extruded from an orifice of an extruder at 290° C. and casted on a cooling drum with applying the electropinning method to obtain an amorphous polyester sheet having a thickness of 100 μm. The sheet was stretched in the machine direction at 95° C. at a draw ratio of 3.5 times.

On one surface of the sheet, was coated a coating liquid containing 1900 parts of water and 100 parts of a water-dispersible polyester which had Tg of 61° C. and consisted of 92% by mole of terephthalic acid and 8% by mole of sodium sulfoisophthalate as the dicarboxylic acid components, and 75% by mole of ethylene glycol and 25% by mole of diethylene glycol as the glycol components.

Then, the film carrying the applied coating 1 liquid was stretched in the transverse direction at 110° C. at a draw ratio of 3.5 times and again in the machine direction at 120° C. at a draw ratio of 1.1 times, followed by heat treatment at 230° C. to obtain a biaxially oriented polyester film consisting of the base polyester film having a thickness of 7.5 μm and the coating layer having a thickness of 0.06 μm.

The properties of the obtained coated film are shown in Tables 1 and 2. The film had good adhesion and process stability.

EXAMPLE 2

In the same manner as in Example 1 except that, as a coating liquid, a mixture of 1900 parts of water and 100 parts of a water-dispersible polyester which consisted of, as the dicarboxylic acid components, 75% by mole of terephthalic acid, 17% by mole of isophthalic acid and 8% by mole of sodium sulfoisophthalate, and as the glycol components, 65% by mole of ethylene glycol and 35% by mole of diethylene glycol was used, a coated polyester film was prepared.

The properties of the obtained coated film are shown in Tables 1 and 2. The film had good adhesion and process stability.

EXAMPLE 3

A mass of polyethylene terephthalate having an intrinsic viscosity of 0.62 was extruded from an orifice of an extruder at 290° C. and casted on a cooling drum with applying the electropinning method to obtain an amorphous polyester sheet having a thickness of 100 μm. The sheet was stretched in the machine direction at 95° C. at a draw ratio of 3.5 times.

On one surface of the sheet, was coated a coating liquid which contained 1900 parts of water, 5 parts of silica sol having an average particle size of 0.07 μm and 95 parts of a water-dispersible polyester which had Tg of 61° C. and consisted of 92% by mole of terephthalic acid and 8% by mole of sodium sulfoisophthalate as the dicarboxylic acid components, and 75% by mole of ethylene glycol and 25% by mole of diethylene glycol as the glycol components.

Then, the film carrying the applied coating liquid was stretched in the transverse direction at 110° C. at a draw ratio of 3.5 times and again in the machine direction at 120° C. at a draw ratio of 1.1 times, followed by heat treatment at 230° C. to obtain a biaxially oriented polyester film consisting of the base polyester film having a thickness of 7.5 μm and the coating layer having a thickness of 0.06 μm.

The properties of the obtained coated film are shown in Tables 1 and 2. The film had good adhesion and process stability.

Comparative Example 1

In the same manner as in Example 3 except that no coating layer was formed, a biaxially oriented polyester film was prepared.

The properties of the obtained film are shown in Tables 1 and 2. The film had poor adhesion and workability and was practically unacceptable.

Comparative Example 2

In the same manner as in Example 1 except that, as a coating liquid, a mixture of 1900 parts of water and 100 parts of a water-dispersible polyester which had Tg of 3° C. and consisted of 50% by mole of terephthalic acid, 45% by mole of sebacic acid and 5% by mole of sodium sulfoisophthalate as the dicarboxylic acid components, and 75% by mole of ethylene glycol and 25% by mole of diethylene glycol as the glycol components was used, a biaxially oriented polyester film was prepared.

The properties of the obtained film are shown in Tables 1 and 2. The film adhered to the heating roll for restretching and could not be restretched continuously. In addition, the film had poor blocking property and was practically unacceptable.

Comparative Example 3

In the same manner as in Example 1 except that an extruded amount of the polyethylene terephthalate was decreased and the film was not restretched in the machine direction, a biaxially oriented polyester film having a thickness of 7.5 μm was prepared.

The properties of the obtained film are shown in Tables 1 and 2. The film was poor in skew characteristic and practically unacceptable.

EXAMPLE 4

A mass of polyethylene-2,6-naphthalate having an intrinsic viscosity of 0.57 and containing 0.1% of spherical silica particles having an average particle size of 0.27 μm was extruded from an orifice of an extruder at 295° C. and casted on a cooling drum with applying the electropinning method to obtain an amorphous polyester sheet having a thickness of 111 μm. The sheet was stretched in the machine direction at 142° C. at a draw ratio of 4.0 times.

On one surface of the sheet, the same coating liquid as used in Example 1 was coated.

Then, the film carrying the applied coating liquid was stretched in the transverse direction at 142° C. at a draw ratio of 3.7 times and again in the machine direction at 135° C. at a draw ratio of 1.25 times, followed by heat treatment at 220° C. to obtain a biaxially oriented polyester film consisting of the base polyester film having a thickness of 6.0 μm and the coating layer having a thickness of 0.06 μm.

The properties of the obtained coated film are shown in Tables 1 and 2. The film had good adhesion and process stability.

EXAMPLE 5

In the same manner as in Example 1 except that, as a coating liquid, a mixture of 1900 parts of water and 100 parts of a water-dispersible polyesterpolyurethane having Tg of 45° C. (AP-40 manufactured by Dainippon Ink and Chemicals, Inc.) was used, a biaxially oriented film was prepared.

The properties of the obtained coated film are shown in Tables 1 and 2. The film had good adhesion and process stability.

TABLE 1

| Example No. | Tg of the polymer in coating liquid (°C.) | Ra (μm) | $F_5$ value (kgf/ mm$^2$) | Roll adhesion | Blocking | White powder | Ink adhesion |
|---|---|---|---|---|---|---|---|
| 1 | 61 | 0.008 | 15 | O | O | O | O |
| 2 | 38 | 0.008 | 15 | O | O | O | O |
| 3 | 61 | 0.008 | 15 | O | O | O | O |
| 4 | 61 | 0.008 | 30 | O | O | O | O |
| 5 | 45 | 0.008 | 15 | O | O | O | O |
| C. 1 | — | 0.002 | 15 | Δ | — | — | X |
| C. 2 | 3 | 0.008 | 15 | X | — | — | O |
| C. 3 | 61 | 0.008 | 12 | O | O | O | O |

TABLE 2

| Example No. | Electromagnetic conversion characteristics | Skew | Adhesion of magnetic layer | Overall evaluation |
|---|---|---|---|---|
| 1 | O | O | O | O |
| 2 | O | O | O | O |
| 3 | O | O | O | O |
| 4 | O | O | O | O |
| 5 | O | O | O | O |
| C. 1 | — | — | X | X |
| C. 2 | — | — | O | X |
| C. 3 | O | X | O | X |

EXAMPLE 6

A mass of polyethylene terephthalate having an intrinsic viscosity of 0.62 was extruded from an orifice of an extruder at 290° C. and casted on a cooling drum with applying the electropinning method to obtain an amorphous polyester sheet having a thickness of 100 μm. The sheet was stretched in the machine direction at 95° C. at a draw ratio of 3.5 times.

On one surface of the sheet, was coated a coating liquid containing 1900 parts of water, 10 parts of polysodium acrylate and 90 parts of a water-soluble polyester which consisted of 92% by mole of terephthalic acid and 8% by mole of sodium sulfoisophthalate as the dicarboxylic acid components, and 75% by mole of ethylene glycol and 25% by mole of diethylene glycol as the glycol components.

Then, the film carrying the applied coating liquid was stretched in the transverse direction at 110° C. at a draw ratio of 3.5 times and again in the machine direction at 120° C. at a draw ratio of 1.1 times, followed by heat treatment at 230° C. to obtain a biaxially oriented polyester film consisting of the base polyester film having a thickness of 7.5 μm and the coating layer having a thickness of 0.05 μm.

The properties of the obtained coated film are shown in Tables 3 and 4. The film had good adhesion and process stability.

EXAMPLE 7

In the same manner as in Example 6 except that, as a coating liquid, a mixture of 1900 parts of water, 5 parts of silica sol having an average particle size of 0.05 μm and 85 parts of a water-soluble polyester which consisted of, as the dicarboxylic acid components, 92% by mole of terephthalic acid and 8% by mole of sodium sulfoisophthalate, and as the glycol components, 75% by mole of ethylene glycol and 25% by mole of diethylene glycol, 10 parts of polysodium acrylate was used, a coated polyester film was prepared.

The properties of the obtained coated film are shown in Tables 3 and 4. The film had good adhesion and process stability.

EXAMPLE 8

A mass of polyethylene-2,6-naphthalate was extruded from an orifice of an extruder at 295° C. and casted on a cooling drum with applying the electropinning method to obtain an amorphous polyester sheet having a thickness of about 111 μm. The sheet was stretched in the machine direction at 142° C. at a draw ratio of 4.0 times.

On one surface of the sheet, the same coating liquid as used in Example 6 was coated.

Then, the film carrying the applied coating liquid was stretched in the transverse direction at 142° C. at a draw ratio of 3.7 times and again in the machine direction at 135° C. at a draw ratio of 1.25 times, followed by heat treatment at 220° C. to obtain a biaxially oriented polyester film consisting of the base polyester film having a thickness of 6.0 μm and the coating layer having a thickness of 0.05 μm.

The properties of the obtained coated film are shown in Tables 3 and 4. The film had good adhesion and process stability.

EXAMPLE 9

In the same manner as in Example 8 except that the same coating liquid as used in Example 7 was used, a biaxially oriented polyester film was prepared.

The properties of the obtained coated film are shown in Tables 3 and 4. The film had good adhesion and process stability.

EXAMPLE 10

In the same manner as in Example 6 except that, as a coating liquid, a mixture of 1900 parts of water, 10 parts of polysodium acrylate and 1900 parts of water and 90 parts of a water-dispersible polyesterpolyurethane (AP-40 manufactured by Dainippon Ink and Chemicals, Inc.) was used, a biaxially oriented polyester film was prepared.

The properties of the obtained coated film are shown in Tables 3 and 4. The film had good adhesion and process stability.

EXAMPLE 11

In the same manner as in Example 6 except that, as a coating liquid, a mixture of 1900 parts of water, 10 parts of polysodium acrylate, 5 parts of silica sol having an average particle size of 0.05 μm and 85 parts of a water-dispersible polyesterpolyurethane (AP-40 manufactured by Dainippon Ink and Chemicals, Inc.) was used, a biaxially oriented polyester film was prepared.

The properties of the obtained coated film are shown in Tables 3 and 4. The film had good adhesion and process stability.

TABLE 3

| Example No. | Ra (μm) | $F_5$ value (kgf/mm$^2$) | Roll adhesion | Blocking | White powder | Ink adhesion |
|---|---|---|---|---|---|---|
| 6 | 0.008 | 15 | O | O | O | O |
| 7 | 0.009 | 15 | O | O | O | O |
| 9 | 0.008 | 30 | O | O | O | O |
| 9 | 0.009 | 30 | O | O | O | O |
| 10 | 0.008 | 15 | O | O | O | O |
| 11 | 0.009 | 15 | O | O | O | O |

TABLE 4

| Example No. | Electromagnetic conversion characteristics | Skew | Adhesion of magnetic layer | Overall evaluation |
|---|---|---|---|---|
| 6 | O | O | O | O |
| 7 | O | O | O | O |
| 8 | O | O | O | O |
| 9 | O | O | O | O |
| 10 | O | O | O | O |
| 11 | O | O | O | O |

EXAMPLE 12

A mass of polyethylene terephthalate having an intrinsic viscosity of 0.62 was extruded from an orifice of an extruder at 290° C. and casted on a cooling drum with applying the electropinning method to obtain an amorphous polyester sheet having a thickness of 100 μm. The sheet was stretched in the machine direction at 95° C. at a draw ratio of 3.5 times.

On one surface of the sheet, was coated a coating liquid which contained 1900 parts of water, 5 parts of a polyolefin wax (a lubricant) (Nopcoat PEM-17 manufactured by Sunnopco) and 100 parts of a water-soluble polyester which consisted of 92% by mole of terephthalic acid and 8% by mole of sodium sulfoisophthalate as the dicarboxylic acid components, and 75% by mole of ethylene glycol and 25% by mole of diethylene glycol as the glycol components.

Then, the film carrying the applied coating liquid was stretched in the transverse direction at 110° C. at a draw ratio of 3.5 times and again in the machine direction at 120° C. at a draw ratio of 1.1 times, followed by heat treatment at 230° C. to obtain a biaxially oriented polyester film consisting of the base polyester film having a thickness of 7.5 μm and the $F_5$ value of 18.5 kgf/mm$^2$ and a coating layer having a thickness of 0.06 μm.

The properties of the obtained coated film are shown in Table 5. The film had good adhesion and process stability.

A VTR tape which used the above biaxially oriented polyester film as a base film was excellent in a VTR head output and a skew property.

EXAMPLE 13

In the same manner as in Example 12 except that an aqueous dispersion of polyethylene (Hiteck E4B manufactured by Toho Chemical Co., Ltd.) as a lubricant, a biaxially oriented polyester film was prepared.

The properties of the obtained coated film are shown in Table 5. The film had good adhesion and process stability.

EXAMPLE 14

In the same manner as in Example 12 except that a water-soluble polyalkylene glycol (PAG)-modified silicone (YF 3842 manufactured by Toshiba Silicone Co., Ltd.) as a lubricant, a biaxially oriented polyester film was prepared.

The properties of the obtained coated film are shown in Table 5. The film had good adhesion and process stability.

EXAMPLE 15

In the same manner as in Example 12 except that, in place of the water-soluble polyester, a water-soluble polyurethane consisting of 10 parts of isophoronediisocyanate and 90 parts of a carboxyl group-modified polyester which was a reaction product of 6% by weight of 2,2-dimethylolpropionic acid and 94% by weight of a polyester made up of the dicarboxylic acid components containing 60% by mole of terephthalic acid and 40% by mole of isophthalic acid and the glycol components containing 61% by mole of ethylene glycol and 39% by mole of diethylene glycol, a biaxially oriented polyester film was prepared.

The properties of the obtained coated film are shown in Table 5. The film had good adhesion and process stability.

EXAMPLE 16

In the same manner as in Example 12 except that an emulsion of a water-soluble polyacrylate which was prepared by emulsion polymerizing 51 parts of ethyl acrylate, 40 parts of methyl methacrylate and 9 parts of methacrylic acid and pH of which was adjusted at 7.5 with an aqueous ammonium was used in place of the water-soluble polyester, a biaxially oriented polyester film was prepared.

The properties of the obtained coated film are shown in Table 5. The film had good adhesion and process stability.

TABLE 5

| Example No. | Content of binder resin (parts) | Content of lubricant (parts) | Angle of contact (deg.) | Adhesion of magnetic layer | Adhesion to heating roll | White powder |
|---|---|---|---|---|---|---|
| 12 | Polyester (95) | Polyethylene (5) | 77 | O | O | O |
| 13 | Polyester (90) | Polyethlene (10) | 79 | O | O | O |
| 14 | Polyester (95) | PAG-silicone (5) | 81 | O | O | O |
| 15 | Polyurethane (95) | Polyethylene (5) | 79 | O | O | O |

EXAMPLE 17

In the same manner as in Example 3 except that silica sol having an average particle size of 0.1 $\mu$m was used, a biaxially oriented polyester film was prepared.

The properties of the obtained coated film are shown in Tables 6–8. The film had good adhesion and process stability.

EXAMPLE 18

In the same manner as in Example 3 except that a thickness of the coating layer was changed to 0.1 $\mu$m and an average particle size of the silica sol was changed to 0.1 $\mu$m, a biaxially oriented polyester film was prepared.

The properties of the obtained coated film are shown in Tables 6–8. The film had good adhesion and process stability.

EXAMPLE 19

In the same manner as in Example 3 except that cross-linked polyethylene particles having an average particle size of 0.1 $\mu$m in place of the silica sol, a biaxially oriented polyester film was prepared.

The properties of the obtained coated film are shown in Tables 6–8. The film had good adhesion and process stability.

EXAMPLE 20

A mass of polyethylene-2,6-naphthalate having an intrinsic viscosity of 0.68 was extruded from an orifice of an extruder at 290° C. and casted on a cooling drum with applying the electropinning method to obtain an amorphous polyester sheet having a thickness of about 115 $\mu$m. The sheet was stretched in the machine direction at 130° C. at a draw ratio of 4.0 times.

On one surface of the sheet, the same coating liquid as used in Example 3 was coated.

Then, the film carrying the applied coating liquid was stretched in the transverse direction at 130° C. at a draw ratio of 4.0 times and again in the machine direction at 140° C. at a draw ratio of 1.1 times, followed by heat treatment at 220° C. to obtain a biaxially oriented polyester film consisting of the base polyester film having a thickness of 6.0 $\mu$m and the coating layer having a thickness of 0.05 $\mu$m.

The properties of the obtained coated film are shown in Tables 6–8. The film had good adhesion and process stability.

EXAMPLE 21

In the same manner as in Example 3 except that, as a coating liquid, a mixture of 1900 parts of water, 5 parts of silica sol having an average particle size of 0.07 $\mu$m and 65 parts (solid content) of water-dispersible polyesterurethane having a carboxylic acid salt group (AP-40 manufactured by Dainippon Ink and Chemicals, Inc.), 20 parts of a water-dispersible polyester having a sulfonic acid salt group (ES-650 manufactured by Dainippon Industries, Co., Ltd.) was used as a coating liquid, a biaxially oriented polyester film was prepared.

The properties of the obtained coated film are shown in Tables 6–8. The film had good adhesion and process stability.

EXAMPLE 22

In the same manner as in Example 3 except that, as a coating liquid, a mixture of 1900 parts of water, 5 parts of silica sol having an average particle size of 0.07 μm, 20 parts of a water-dispersible polyester (ES-670 manufactured by Dainippon Industries Co., Ltd.), 65 parts of a water-soluble acrylic resin (Jelymer AT-M 915 manufactured by Nippon Junyaku, Co., Ltd.) which comprised methyl methacrylate, isobutyl methacrylate, acrylic acid, methacrylic acid and glycidyl methacrylate, the carboxylic acid salt groups of which were neutralized with ammonia and a content of the ammonium salt groups of which was increased to make the polymer water-soluble, a biaxially oriented polyester film was prepared.

The properties of the obtained coated film are shown in Tables 6-8. The film had good adhesion and process stability.

TABLE 6

| Example No. | Thickness of coating layer (d) (μm) | Particles | Average diameter of particles (t) (μm) | t - d | Content of particles (wt. %) |
|---|---|---|---|---|---|
| 17 | 0.06 | Silica | 0.10 | 0.04 | 5 |
| 18 | 0.10 | Silica | 0.15 | 0.05 | 5 |
| 19 | 0.06 | Organic particles | 0.10 | 0.04 | 5 |
| 20 | 0.05 | Silica | 0.07 | 0.02 | 5 |
| 21 | 0.06 | Silica | 0.07 | 0.01 | 5 |
| 22 | 0.06 | Silica | 0.07 | 0.01 | 5 |

TABLE 7

| Example No. | Ra (μm) | F5 value (kgf/mm²) | Roll adhesion | Blocking | White powder | Ink adhesion |
|---|---|---|---|---|---|---|
| 17 | 0.008 | 15 | O | O | O | O |
| 18 | 0.009 | 15 | O | O | O | O |
| 19 | 0.008 | 15 | O | O | O | O |
| 20 | 0.008 | 20 | O | O | O | O |
| 21 | — | — | O | O | O | O |
| 22 | — | — | O | O | O | O |

TABLE 8

| Example No. | Electromagnetic conversion characteristics | Skew | Adhesion of magnetic layer | Overall evaluation |
|---|---|---|---|---|
| 17 | O | O | O | O |
| 18 | O | O | O | O |
| 19 | O | O | O | O |
| 20 | O | O | O | O |
| 21 | O | O | O | O |
| 22 | O | O | O | O |

What is claimed is:

1. A polyester resin film which is biaxially oriented and again oriented in a machine direction and a continuous coating layer formed on at least one surface of said film, wherein said continuous coating layer contains at least 50% by weight of a water-soluble or water-dispersible polyester resin having a glass transition temperature of at least 20° C.

2. The polyester resin film according to claim 1, wherein said coating layer has standing-up protuberances formed from a water-soluble or water-dispersible resin.

3. The polyester resin film according to claim 1, wherein in or on said coating layer there is 0.5 to 20% by weight of a lubricant, based on the weight of the coating layer.

4. The polyester resin film according to claim 1, wherein a surface of said coating resin has an angle of contact to a water droplet of 70 to 85 degrees.

5. The polyester resin film according to claim 1, wherein a thickness of said coating layer is from 0.03 to 2 μm, and said coating layer contains 0.1 to 20% by weight of inorganic or organic particles which have an average particle size satisfying the following relationship:

$$0.5 \leq d/t \leq 3,$$

wherein d is said average particle size in μm and t is said thickness of said coating layer in μm.

6. The polyester resin film according to claim 1, wherein the film comprises a polyethylene terephthalate in which at least 80% of the repeating units are ethylene-terephthalate units, a polyethylene naphthalate in which at least 80% of the repeating units are ethylene-naphthalate units, or a poly-1,4-cyclohexanedimethylene terephthalate in which at least 80% of the repeating units are 1,4-cyclohexanedimethylene-terephthalate units.

7. The polyester resin film according to claim 1, wherein applied to the outside of the coating layer is a magnetic paint, an adhesive, or an ink.

8. The polyester resin film according to claim 1, wherein said glass transition temperature is from 20° to 70° C.

9. The polyester resin film according to claim 1, wherein said coating layer contains at least 70% by weight of said water-soluble or water-dispersible polyester resin.

10. The polyester resin film according to claim 1, wherein said water-soluble or water-dispersible polyester resin present in the coating layer contains an anionic group such that the coating layer is self-dispersing in water.

11. The polyester resin film according to claim 1, wherein said coating layer is applied to the film after said polyester resin film is stretched for the first time in the machine direction and before said film is first stretched in the transverse and stretched again in the machine direction.

12. The polyester resin film according to claim 2, wherein said protuberances are formed from 1 to 50% of a resin selected from the group consisting of a cellulose, a gelatin, a polyacrylic acid or a salt thereof, and a polystyrenesulfonic acid or a salt thereof.

13. The polyester resin film according to claim 3, wherein said lubricant is a polyolefin or silicone lubricant.

14. The polyester resin film according to claim 1, wherein the thickness of the coating layer is 0.05 to 1 micrometers.

15. The polyester resin film according to claim 3, wherein the coating layer additionally contains a water-soluble or water-dispersible polyurethane resin.

16. The polyester resin film according to claim 3, wherein the coating layer additionally contains a water-soluble or water-dispersible acrylic resin.

17. The polyester resin film according to claim 3, wherein the coating layer is applied to both sides of the polyester film, wherein the coating layer may be the same or different.

18. The polyester resin film according to claim 3, wherein the polyester film has an F5 value of at least 13 kgf/mm² and is a polyethylene terephthalate film in which at least 80% of the repeating units are ethylene-terephthalate units.

19. The polyester resin film according to claim 3, wherein the coating layer has a center line average roughness of 0.002 to 0.02 micrometers.

* * * * *